United States Patent [19]

Altman

[11] Patent Number: 5,651,679
[45] Date of Patent: Jul. 29, 1997

[54] VIRTUAL POLYHEDRA MODELS

[76] Inventor: Frederick Jerome Altman, 1020 N. Quincy #213, Arlington, Va. 22201

[21] Appl. No.: 534,877

[22] Filed: Sep. 27, 1995

[51] Int. Cl.$^6$ .................................................. G09B 23/04
[52] U.S. Cl. ........................................................ 434/211
[58] Field of Search .................................. 434/211, 403, 434/303; 472/63

[56] References Cited

U.S. PATENT DOCUMENTS

| 718,326 | 1/1903 | Diem | 472/63 X |
|---|---|---|---|
| 1,346,017 | 7/1920 | Goodman | 434/303 X |
| 2,607,142 | 8/1952 | Lee | 472/63 X |
| 5,475,532 | 12/1995 | Sandoval et al. | 359/616 |

FOREIGN PATENT DOCUMENTS

| 3434109 | 3/1986 | Germany | 434/211 |

OTHER PUBLICATIONS

Cundy and Rollett, *Mathematical Models*, Cambridge University Press, 1961, pp. 90–99.

Primary Examiner—Jeffrey A. Smith

[57] ABSTRACT

Kaleidoscopes are used to show solid-appearing images of the Platonic and Archimedean polyhedra (except the snub solids) and of the Kepler-Poinsot stellations. The polyhedra are divided into families related by possessing the same planes of mirror and rotational symmetry, thus using reflectors consisting of three to five mirrors meeting at vertices with specified angles, and corresponding fractions of the solids, such as an octant of the cube for the whole. The fractions may be truncated to form elements representing other members of the families. Slices formed by successive truncations may be superposed to make smaller the elements required. The stellations result from the insertion of the star's "rays" or fractions into reflectors identical with those above. All images appear as solids, not just vertex points, and are viewable over wide angles. The elements are much smaller than the polyhedra, and the reflectors can be folded and/or disassembled for ease of storage and transportation.

10 Claims, 3 Drawing Sheets

VIRTUAL POLYHEDRA MODELS

BACKGROUND OF THE INVENTION

Platonic polyhedra models have been readily available for a long time, but the Archimedean solids and stellations are seldom seen outside of museums. Their major attraction is their complexity, but this has meant great difficulty in their production. The table emphasizes the relative simplicity of the Platonic solids and the fascinating complexity of the Archimedean and the stellations.

TABLE 1

POLYHEDRON FACES

|    |      |                 | Triangles | Squares | Pentagons | Hexagons |          |
| -- | ---- | --------------- | --------- | ------- | --------- | -------- | -------- |
|    |      | PLATONIC -- (Regular - Equal, regular faces) | | | | | |
| 1  | TET  | Tetrahedron     | 4         |         |           |          |          |
| 2  | CUBE | Cube            |           | 6       |           |          |          |
| 3  | OCT  | Octahedron      | 8         |         |           |          |          |
| 4  | DOD  | Dodecahedron    |           |         | 12        |          |          |
| 5  | ICOS | Icosahedron     | 20        |         |           |          |          |
|    |      | ARCHIMEDEAN -- (Uniform - Regular faces, vertices alike) | | | | | |
| 6  | TT   | Truncated TET   | 4         |         |           | 4        |          |
| 7  | TO   | Trunc. OCT      | 6         |         |           | 8        |          |
| 8  | CO   | Cuboctahedron   | 8         | 6       |           |          | Octagons |
| 9  | TC   | Trunc. Cube     | 8         |         |           |          | 6        |
| 10 | TCO  | Trunc. Cuboct.  |           | 12      |           | 8        | 6        |
| 11 | RCO  | Rhombicuboct.   | 8         | 18      |           |          |          |
| 12 | SNC  | Snub Cube       | 32        | 6       |           |          |          |
| 13 | TI   | Trunc. Icosahed.|           |         | 12        | 20       |          |
| 14 | ID   | Icosidodecahed. | 20        |         | 12        |          | Decagons |
| 15 | TD   | Trunc. Dodecahed.| 20       |         |           |          | 12       |
| 16 | TID  | Trunc. Icosidod.|           | 30      |           | 20       | 12       |
| 17 | RID  | Rhombicosidod.  | 20        | 30      | 12        |          |          |
| 18 | SND  | Snub Dodecahed. | 80        |         | 12        |          |          |
|    |      | STELLATIONS -- (Uniform, non-convex) | | | | | |
| 19 | GSD  | Great Stell. DOD| 60        |         |           |          |          |
| 20 | GD   | Great DOD       | 60        |         |           |          |          |
| 21 | SSD  | Small Stell. DOD| 60        |         |           |          |          |
| 22 | GI   | Great ICOS      | 180       |         |           |          |          |

On page 381 of the *Mathematische Zeitschrift*, vol.46 (1940) H. S. M. Coxeter states "that a polyhedron is edge-reflexible if all its edges are perpendicularly bisected by planes of symmetry", that "the vertices of any edge-reflexible polyhedron can be constructed . . . by reflections of a single point . . . by means of the polyhedral kaleidoscope, . . . a set of three plane mirrors, suitably inclined to one another", and that "the only uniform polyhedra which are not edge-reflexible are the snub cube, the snub dodecahedron and the antiprisms".

In his Chapter 3.2, "The Icosahedral Kaleidoscope" of *Regular Complex Polytopes*, MacMillan, New York, 1976, Coxeter describes a three-mirror device for recreating visually the ICOS, DOD, and some stellations. Its sharp vertex angles (about 21, 32, and 37 degrees) produce an undesirably small asymmetric field of view and only an, unconvincing linear outline of the solid, created by a line segment which is difficult to change.

In Solids,Geometric on p.861 of Vol.20 of the *Encyclopedia Britannica*, 1969, he states that as the TC can be formed by truncation of the CUBE, so the CO, TO, and OCT (the rest of the CUBE-OCT or C-O family) can be formed similarly by successive truncation, that this process can be reversed, OCT to CUBE (O-C family), and that this system applies similarly to the ICOS, TI, ID, TD, DOD (I-D family) and its reverse (D-I family).

SUMMARY OF THE INVENTION

In this invention, elements are placed within reflectors made of three to five front-surface mirrors meeting at vertices with equal large specified angles so that the polyhedra of interest are displayed not just as points or lines, but as solids, by the elements and their reflections. The elements are fractions of the total solid, e.g. for the CUBE, one-eighth of the total cube, determined by three orthogonal planes of symmetry. The total CUBE is visually created by reflections in the mirrors. The element may be the octant, the truncated octant, or the superposition of several truncated slices of the octant. The solids of interest may be easily changed, and are visible over large viewing angles. This method uses elements much simpler and smaller than the polyhedra themselves, making them more easily transported and stored, and the reflectors can be flattened by folding or disassembly.

Detailed Description

The polyhedron models are made by placing elements into a polyhedral kaleidoscope of three to five mirrors meeting at a point. The elements are polyhedron fractions, in most cases truncated, determined by the planes of symmetry as shown in Table 2, which indicates the application of the principle to all the uniform solids except the snubs. Table 2 shows whether the axis passes through opposite vertices V and/or through the centers of faces F (polygons of 3,4,5,6, 8,10 sides), the resulting 3-, 4-, 5-fold symmetry (number of mirrors), the fraction of the solid of interest, and the mirror vertex angles.

that they will not have to be repeated for the O-C, D-I, and I-D families.

TABLE 3

POLYHEDRON DETAILS

| | Family — | | | |
|---|---|---|---|---|
| | CUBE-OCT | OCT-CUBE | DOD-ICOS | ICOS-DOD |
| FIG. | 2 | 3 | 4 | 5 |
| No. of Mirrors | 3 | 4 | 3 | 5 |
| Vertex Angles | 90.0 | 70.4 | 63.4 | 41.8 |
| Lower Angles | 35.3 | 45.0 | 20.9 | 31.7 |
| Upper Angles | 35.3 | 35.3 | 52.6 | 52.6 |
| Cuts | TC 1 = 2 × 2 | TO 1 = 2 × 2 | TD 1 = 2 × 2 | TI 1 = 2 × 2 |
| | CO 3 Tri | CO 3 Sqr | ID 3 Tri | ID 3 Pnt |
| | TO 4 Hex | TC 4 Oct | TI 4 Hex | TD 4 Dec |
| | OCT 5 Tri | CUBE 5 Sqr | ICOS 5 Tri | DOD 5 Pnt |

Figure 2:
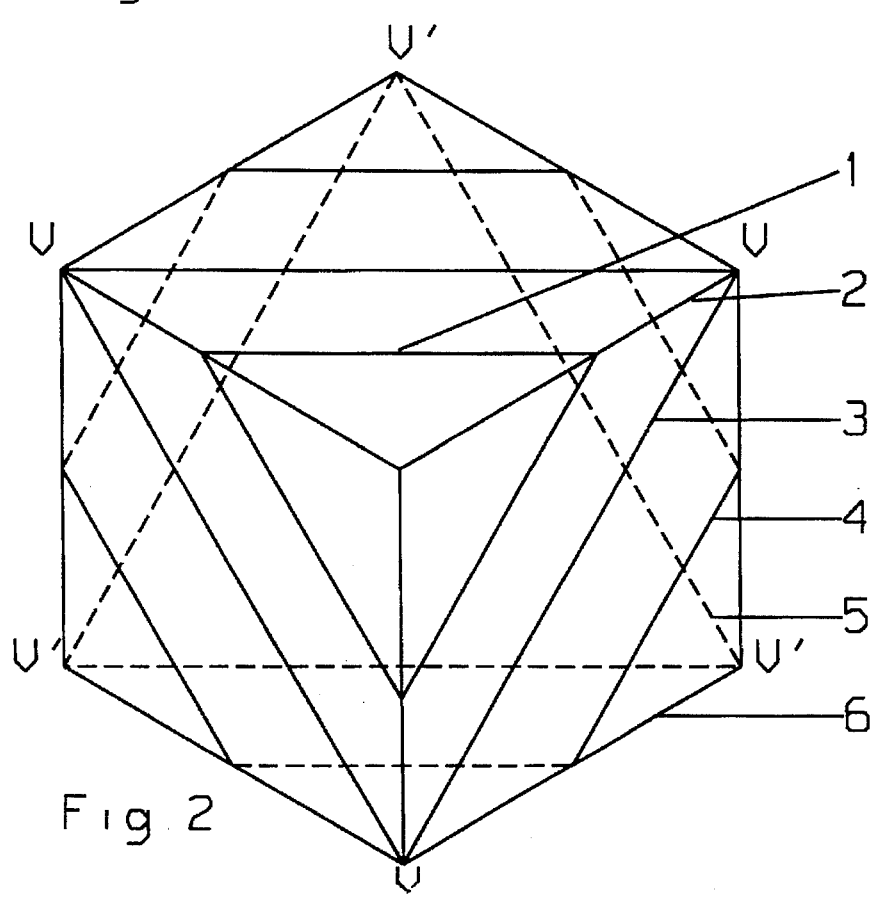
FIG. 2 shows the CUBE octant successively truncated (cut parallel to the page) to produce elements for images as above of the TC, CO, TO, and OCT.
Figure 3:
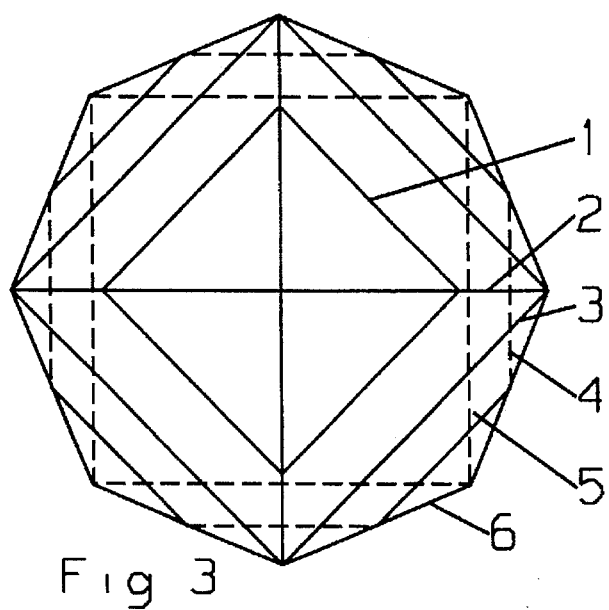
FIG. 3 shows one-sixth of an OCT which when placed in a reflector of four mirrors with vertex angles of 70.4 degrees produces an image of the full OCT, and the successive truncations producing elements for the TO, CO, TC, and CUBE.
Figure 4:
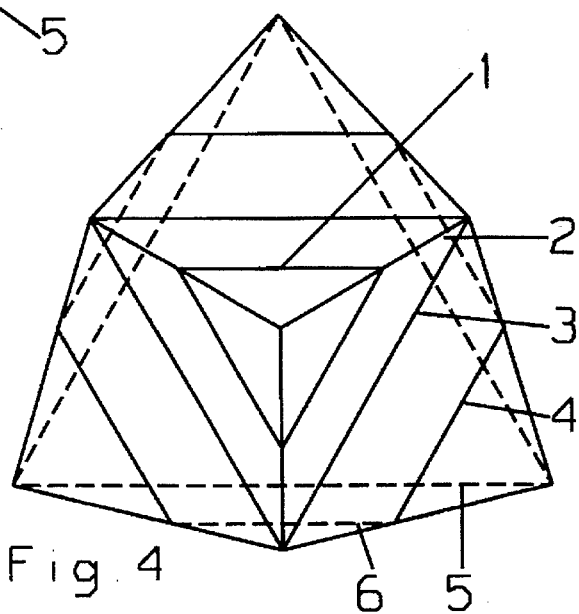
FIG. 4 shows one-twentieth of a DOD which when placed in a reflector of three mirrors with vertex angles of 63.4 degrees produces an image of the full DOD, and the successive truncations producing elements for the TD, ID, TI, and ICOS.
Figure 5:
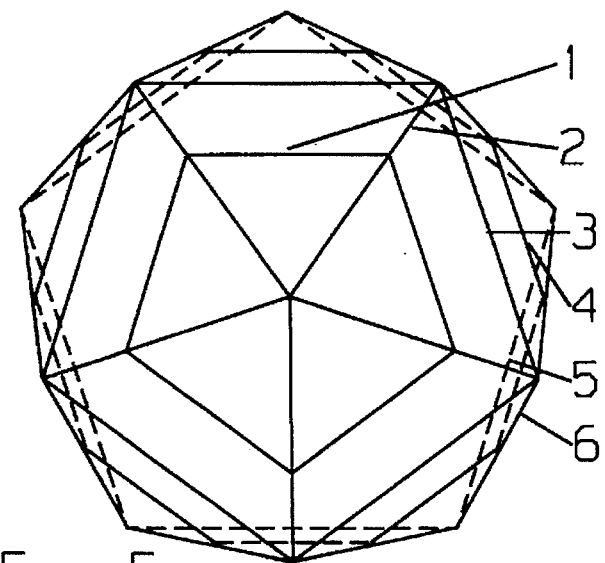
FIG. 5 shows one-twelfth of an ICOS which when placed in a reflector of five mirrors with vertex angles of 41.8 degrees produces an image of the full ICOS, and the successive truncations producing elements for the TI, ID, TD, and DOD.
Figure 6A:
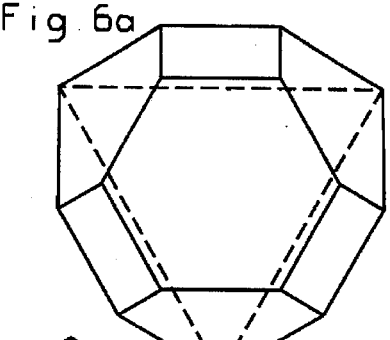
FIG. 6a shows the element of the TCO for the three-mirror 90° reflector and FIG. 6b that of the RCO.
Figure 8A:
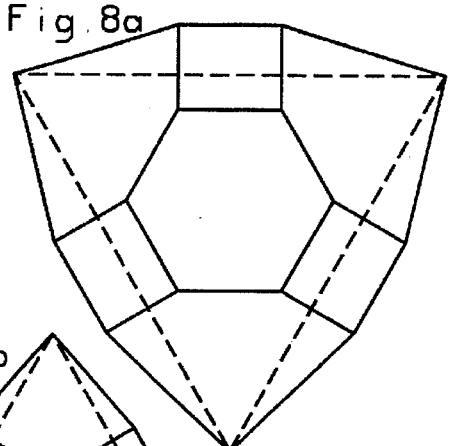
FIG. 8a shows the element of the TID for the three-mirror 63.4° reflector and FIG. 8b that of the RID.
Figure 6B:
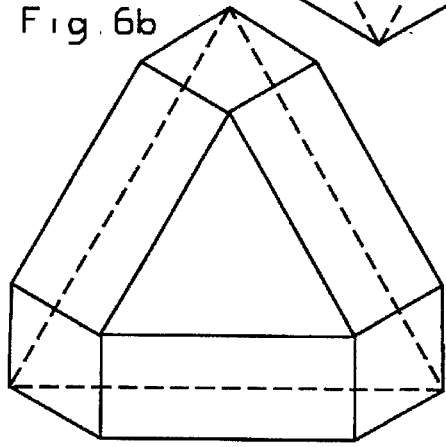
Figure 8B:
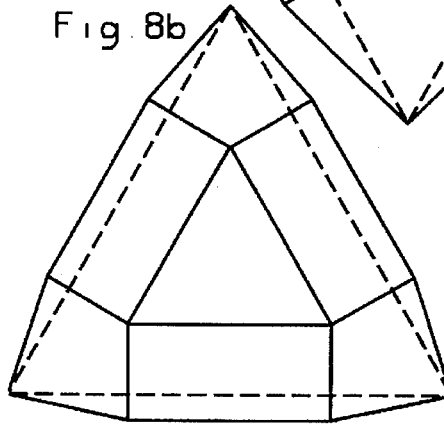
Figure 7A:
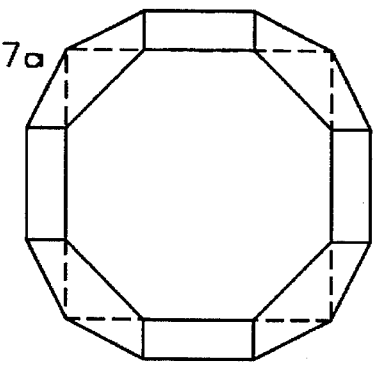
FIG. 7a shows the element of the TCO for the four-mirror 70.4° reflector and FIG. 7b that of the RCO.
Figure 9A:
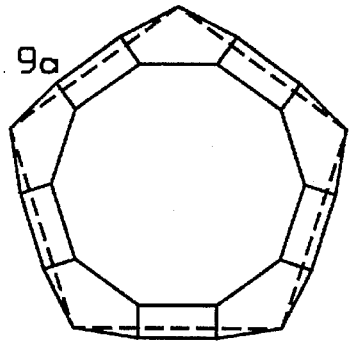
FIG. 9a shows the element of the TID for the five-mirror 41.8° reflector and FIG. 9b that of the RID.
Figure 7B:
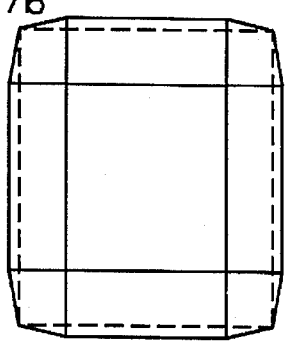
Figure 9B:
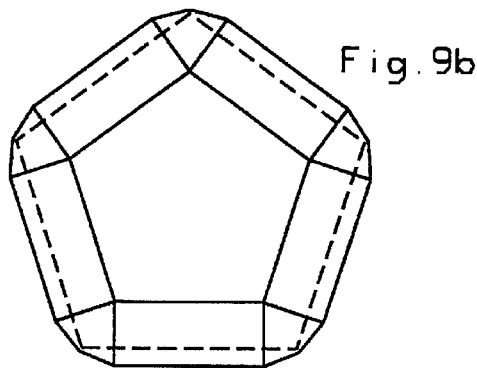

The first four lines are self-explanatory. The lower and upper angles relate to the total solids in the figures, which are bounded by lower and upper surfaces. The lower angle is defined by the reflector and is the angle between the axis of symmetry (vertical to the figure) and the invisible slant faces indicated by dotted lines. The upper angle is defined by the dihedral angle between an upper surface and a truncated face, less 90°, e.g. 125.3°−90°=35.3° between the hexagon 4 and square (by reflection) 4–6 faces of the TO or between the octagon (by reflection) 1–2 and triangle 1 faces of the TC. These are the angles between the visible slant faces in FIG. 2 and the axis (vertical to the figure).

The truncation cuts are shown in the figures and defined in the table. For the C-O family, the first cut is made so that 1 is twice the length of 2, the distance to the vertex,

TABLE 2

POLYHEDRON SYMMETRIES

| Solids | C-O | TID + RID | O-C | TID + RID | D-I | TID − RID | GSD GD | I-D | TID − RID | SSD GI |
|---|---|---|---|---|---|---|---|---|---|---|
| Axis @ V | CUBE | | OCT | | DOD | | 3 | ICOS | | 5 |
| Axis @ F | 6 | 3 | 8 | 4 | 6 | 3 | | 10 | 5 | |
| -fold symm. | 3 | | 4 | | 3 | | | 5 | | |
| Fraction | ⅛ | | ⅙ | | ½₀ | | | ½₂ | | |
| Vert. angle | 90 | | 70.4 | | 63.4 | | | 41.8 | | |

It may be seen that four reflectors (columns) provide 32 solid images and that the T-- and R-- like the C-O and D-I families can each be shown two ways, in different reflectors, e.g. C-O, and DI, ID.

The elements may be the whole fraction, such as one-eighth of the CUBE or one-twentieth of a GSD, a truncated fraction such as one-eighth of a CO, or a superposition of slices formed by successive truncations, which require the minimum material for the C-O, O-C, D-I, and I-D families.

Figure 1:
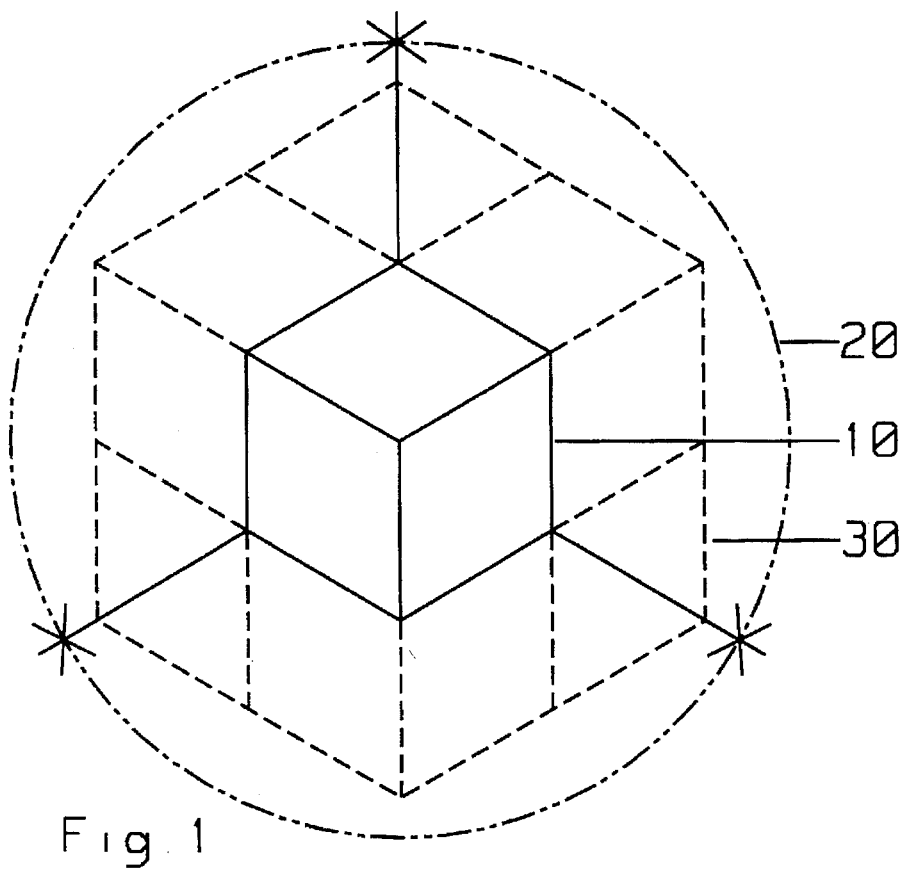
FIG. 1 is an isometric view demonstrating the basic principle, showing one-eighth of a CUBE 10 located in a reflector made of three orthogonal front-surface mirrors 20 (90-degree vertex angles), producing an image 30 (dashed) of the full CUBE.

The C-O family is described below some detail, but the O-C, D-I, and I-D families are constructed and assembled similarly. FIG. 1 shows in isometric projection the basic principle, with an octant 10 of a CUBE placed in a reflector of three orthogonal front-surface mirrors 20 producing the dashed image 30 of the full CUBE. The mirrors may be polished aluminum or stainless steel or even mounted reflective plastic sheet can be used. For the elements forming the other members of the C-O family, the octant of FIG. 1 may be truncated (sliced parallel to the page) as in FIG. 2. The details will be described with reference to the table below so producing in the reflector triangular and octagonal faces as required for the TC. The second cut 3 between the octant vertices V produces the triangles and squares of the CO. The third cut, 4 produces the hexagon and square faces of the TO. The final cut 5, also between octant vertices V', produces the triangular face of the octahedron. This image may be formed by either the octant remainder, or by a thin sheet representing its upper surface.

To produce the C-O slices, a cube of plastic foam may be cut with a hot wire. The resulting shapes may be molded in plastic or cut out of wood if desired. Then the solids may be imaged by superposing in the reflector:

| For result | Use | |
|---|---|---|
| OCT | Thin sheet or pyramidal block with edges | 5 |
| TO | Above plus slice with upper edges | 4 |
| CO | All the above plus slice with edges | 3 |

-continued

| For result | Use | |
|---|---|---|
| TC | As above plus slice with upper edges | 1 |
| CUBE | All the above plus slice with lower edges | 1 |

It may be noted that the elements for TO and CO are, and OCT and TC may be, identical in shape. The O-C, D-I, and I-D families are created similarly using the data in the appropriate columns of the table above, but no elements can be identical.

The slices used to form an element may be held together by use of magnetic tape on upper surfaces, and iron sheet or flush iron screws on lower surfaces.

The polyhedra TCO, RCO, TID, and RID are uniform, as all edges are the same, but they are formed of three different polygons (Table 1) Thus, as seen in Table 2, there are no axes of symmetry through vertices, but there are through either of two face centers, excluding square faces except for the RCO which has square faces (SqC) from the truncated CUBE. Thus the elements to be inserted in the reflectors of Table 2 consist of a center polygon, a half-square next to each mirror, and a segment of what may be called a corner polygon; see FIGS. 6–9. The faces and dihedral angles are shown in Table 4.

TABLE 4

THREE-COMPONENT POLYHEDRA

| | Solid > | | | |
|---|---|---|---|---|
| | TCO | RCO | TID | RID |
| FIG. | 6a 7a | 6b 7b | 8a 9a | 8b 9b |
| Center | Hex Oct | Tri SqC | Hex Dec | Tri Pent |
| Corner | Oct Hex | SqC Tri | Dec Hex | Pent Tri |
| Angle | Hex - Oct | | Hex - Dec | |
| Deg. | 125 | | 143 | |
| Angle | Hex - Sqr | Tri - Sqr | Dec - Sqr | Pent - Sqr |
| Deg. | 145 | 145 | 148 | 148 |
| Angle | Oct - Sqr | SqC - Sqr | Hex - Sqr | Tri - Sqr |
| Deg. | 135 | 135 | 159 | 159 |

The same methods may be applied to another group of polyhedra, the Kepler-Poinsot stellations. The reflectors required are the same as those used above, with numbers of mirrors and vertex angles shown in Table 5. The stellation images of this invention use the above reflectors and star "rays" which are actually the fractions shown in Table 2. The rays and the resulting images are shown in figures in Cundy and Rollett, *Mathematical Models*, Cambridge University Press, 1961 as follows:

TABLE 5

STELLATION PARAMETERS

| | Great DOD | Gt. Stell. DOD | Small Stell. DOD | Great ICOS |
|---|---|---|---|---|
| No. of Mirrors | 3 | 3 | 5 | 5 |
| Vertex Angles | 63.4 | 63.4 | 41.8 | 41.8 |
| Ray Figure | 90* | 93 | 86a | 99 |
| Star Figure | 88 | 91 | 84 | 95 |

*The ray in this case is actually a concave pyramid.

Conclusion, Ramifications, and Scope

Thus the reader will see that the polyhedron models of the invention:

are images appearing as solids over wide viewing angles, not just lines (edges) or points (vertices) over small viewing angles;

use reflectors that can be disassembled or folded for ease of storage or transportation;

require only four different reflectors to represent Platonic and Archimedean polyhedra in two ways each, and the four stellations;

use in the reflectors elements with only a small fraction of the number of faces of the whole polyhedron, greatly simplifying construction;

use elements easier to store and transport than the whole polyhedra.

While my above description contains many specificities, these should not be construed as limitations on the scope of the invention, but rather as an exemplification of preferred embodiments thereof. Many other variations are possible:

reflectors may be made of any reflecting material, preferably front-surface mirrors;

elements may be solid wood, foam, or other plastic, or hollow, bent, or folded sheet plastic or metal providing the same outward appearance;

slices may be joined for stability by magnetic materials or snaps or Velcro (hook-and-loop fastener);

black magnetic sheet on the tops of slices will provide a useful color coding, e.g. the OCT surfaces in the C-O family, but other color treatments may be helpful, particularly for the three-component solids.

Accordingly, the scope of the invention should be determined not by the embodiments illustrated, but by the appended claims and their legal equivalents.

What is claimed is:

1. A method of visually representing a polyhedron comprising the steps of:

selecting a polyhedron to be visually represented;

recognizing the selected polyhedron's planes of symmetry;

arranging a number of front-surface mirrors along selected ones of the recognized planes of symmetry, said number of mirrors being selected from a group of numbers consisting of 3, 4, and 5, and being arranged to form a reflector having a corner with predetermined vertex angles;

providing an element, said element being a fraction of said polyhedron and being cut along the recognized planes of symmetry; and placing said element adjacent said corner so that said element and images of said element formed by said number of mirrors visually form a three-dimensional representation of said polyhedron.

2. The method of claim 1, wherein:

said polyhedron is selected from a group of polyhedra consisting of cube, truncated cube, cuboctahedron, truncated octahedron, octahedron, truncated cuboctahedron, and rhombicuboctahedron;

said number of mirrors is 3 and are arranged to form a reflector having a corner with 90.0 degree vertex angles; and said fraction of said polyhedron is ⅛.

3. The method of claim 1, wherein:

said polyhedron is selected from a group of polyhedra consisting of octahedron, truncated octahedron, cuboctahedron, truncated cube, cube, truncated cuboctahedron, and rhombicuboctahedron;

said number of mirrors is 4 and are arranged to form a reflector having a corner with 70.4 degree vertex angles; and said fraction of said polyhedron is ⅙.

4. The method of claim 1, wherein:

said polyhedron is selected from a group of polyhedra consisting dodecahedron, truncated dodecahedron, icosidodecahedron, truncated icosahedron, icosahedron, truncated icosidodecahedron, rhombicosidodecahedron, great dodecahedron, and great stellated dodecahedron;

said number of mirrors is 3 and are arranged to form a reflector having a corner with 63.4 degree vertex angles; and said fraction of said polyhedron is 1/20.

5. The method of claim 1, wherein:

said polyhedron is selected from a group of polyhedra consisting of icosahedron truncated icosahedron, icosidodecahedron, truncated dodecahedron, dodecahedron, truncated icosidodecahedron, rhombicosidodecahedron, great icosahedron, and small stellated dodecahedron;

said number of mirrors is 5 and are arranged to form a reflector having a corner with 41.8 degree vertex angles; and said fraction of said polyhedron is 1/12.

6. A method of visually representing a family of polyhedra comprising the steps of:

recognizing that there are families of polyhedra which are related by common planes of symmetry;

selecting a family of polyhedra to be visually represented;

recognizing the selected family of polyhedra's common planes of symmetry;

arranging a number of front-surface mirrors along selected ones of the recognized common planes of symmetry, said number of mirrors being selected from a group of numbers consisting of 3, 4, and 5, and being arranged to form a reflector having a corner with predetermined vertex angles;

providing an element selected from a plurality of elements, each of said elements being a fraction of one of said selected polyhedra and being cut along the common planes of symmetry, each of said elements comprising slices derived by successively truncating said fraction of said one of said polyhedra perpendicular to an axis of rotational symmetry; and superposing slices of said element in a reverse order of truncation adjacent said corner with a first of said slices being placed in said corner and with subsequent slices being placed adjacent a previous one of said slices so that said slices and images of said slices formed by said number of mirrors visually form successive three-dimensional representations of said polyhedra of said selected family.

7. The method of claim 6, wherein:

said family of polyhedra is selected to be the CUBE-OCT family;

said number of mirrors is 3 and are arranged to form a reflector having a corner with 90.0 degree vertex angles; and said fraction of one of said polyhedra is ⅛.

8. The method of claim 6, wherein:

said family of polyhedra is selected to be the OCT-CUBE family;

said number of mirrors is 4 and are arranged to form a reflector having a corner with 70.4 degree vertex angles; and said fraction of said one of said polyhedra is ⅙.

9. The method of claim 6, wherein:

said family of polyhedra is selected to be the DOD-ICOS family;

said number of mirrors is 3 and are arranged to form a reflector having a corner with 63.4 degree vertex angles; and said fraction of said one of said polyhedra is 1/20.

10. The method of claim 6, wherein:

said family of polyhedra is selected to be the ICOS-DOD family;

said number of mirrors is 5 and are arranged to form a reflector having a corner with 41.8 degree vertex angles; and said fraction of said one of said polyhedra is 1/12.

* * * * *